(12) United States Patent
Benayon et al.

(10) Patent No.: US 9,823,822 B2
(45) Date of Patent: Nov. 21, 2017

(54) PROCESS DATA PRESENTATION BASED ON PROCESS REGIONS

(71) Applicant: International Business Machines Corporation, Armonk, NY (US)

(72) Inventors: Jay W. Benayon, Thornhill (CA); Kui Yan Lau, Markham (CA); Bernath Ng, North York (CA); Alexander S. Ross, Etobicoke (CA)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 14/608,158

(22) Filed: Jan. 28, 2015

(65) Prior Publication Data

US 2015/0331586 A1 Nov. 19, 2015

Related U.S. Application Data

(63) Continuation of application No. 11/532,445, filed on Sep. 15, 2006, now Pat. No. 8,947,439.

(51) Int. Cl.
*G06F 3/0484* (2013.01)
*G06F 3/0481* (2013.01)
(Continued)

(52) U.S. Cl.
CPC ...... *G06F 3/04842* (2013.01); *G06F 3/04817* (2013.01); *G06Q 10/06* (2013.01); *G06T 11/206* (2013.01)

(58) Field of Classification Search
None
See application file for complete search history.

(56) References Cited

U.S. PATENT DOCUMENTS

| 6,081,278 A | 6/2000 | Chen |
|---|---|---|
| 6,091,422 A | 7/2000 | Ouaknine et al. |

(Continued)

FOREIGN PATENT DOCUMENTS

| JP | 8038433 A | 2/1996 |
|---|---|---|
| WO | WO2005109130 | 11/2005 |

OTHER PUBLICATIONS

Sneiderman, "The Eyes Have It: A Task by Data Type Taxonomy for Information Visualizations," Visual Languages, 1996 Proceedings, IEEE, p. 336-343, 1996.

*Primary Examiner* — Maurice L McDowell, Jr.
*Assistant Examiner* — Donna J Ricks
(74) *Attorney, Agent, or Firm* — Steven M. Greenberg, Esq.; CRGO Law

(57) ABSTRACT

Computer-implemented methods, computer program products and data processing systems for presenting dynamic data pertaining to a process. In one aspect, region information identifying a plurality of user-selected regions of the process, switching information identifying criteria for switching among the user-selected regions, and dynamic data pertaining to the process, are used to generate a dynamic visual representation of the process which emphasizes, at any given time, only one of the user-selected regions. The user-selected region emphasized at any given time is automatically determined according to the criteria for switching. In another aspect, region information identifying at least one user-selected region of the process and dynamic data pertaining to the process are used to generate a dynamic visual representation of at least a portion of the process containing the at least one user-selected region. The visual representation emphasizes each user-selected region within the context of the portion of the process.

10 Claims, 14 Drawing Sheets

(51) Int. Cl.
*G06Q 10/06* (2012.01)
*G06T 11/20* (2006.01)

(56) References Cited

U.S. PATENT DOCUMENTS

| | | |
|---|---|---|
| 6,701,350 B1 | 3/2004 | Mitchell |
| 6,842,176 B2 | 1/2005 | Sang'udi et al. |
| 6,995,768 B2 | 2/2006 | Jou et al. |
| 7,864,158 B1 * | 1/2011 | McGeever ............ G05B 19/409 345/158 |
| 8,050,782 B2 | 11/2011 | Fallman et al. |
| 2004/0088678 A1 * | 5/2004 | Litoiu .................... G06Q 10/06 717/104 |
| 2004/0145588 A1 | 7/2004 | Sathyanarayana |
| 2005/0225552 A1 | 10/2005 | Anand |
| 2006/0017734 A1 | 1/2006 | Faraday et al. |
| 2006/0129270 A1 | 6/2006 | Pankl |
| 2007/0165031 A1 * | 7/2007 | Gilbert ................ G05B 19/0426 345/473 |
| 2008/0065243 A1 * | 3/2008 | Fallman ................ G05B 19/409 700/83 |

* cited by examiner

PROCESS DATA PRESENTATION BASED ON PROCESS REGIONS

CROSS-REFERENCE TO RELATED APPLICATIONS

This application is a Continuation of U.S. application Ser. No. 11/532,445, filed Sep. 15, 2006, the entirety of which is incorporated herein by reference.

FIELD OF THE INVENTION

The present invention relates to the presentation of process-related data, and more particularly to systems, methods and computer program products for presenting process-related data to facilitate user comprehension and analysis of such data.

BACKGROUND OF THE INVENTION

There are many different types of processes for which it is advantageous to present data pertaining to the process and to the subprocesses that make up that process.

For example, in process control applications, such as power generation facilities, information about the current state of the various subprocesses is critical to enabling facility operators to identify and correct potential problems. Failure to timely identify such problems can have a catastrophic effect, and appropriate data presentation methodologies are therefore important.

Another example of a type of process for which data pertaining to the process should be presented is a business process. As used herein, the term "business process" is intended to have a broad meaning, and would include product manufacturing processes, transportation processes, client intake processes, customer file handling processes, customer service processes, and virtually any other process undertaken by a business (or government or non-profit) enterprise. Frequently, computer models of such processes are constructed so as to enable modeling and simulation of these business processes to identify bottlenecks and other possible areas for improvement. These computer models can not only present summary data about the outcome of a process, but can also show the ongoing status of a simulation. For example, the computer model may execute significantly faster than the process being modeled (e.g. one hour of simulated process time may take only one second of real-world time to execute) to enable problems to be anticipated. By using process simulation to anticipate problems, modifications to the process can be made to prevent the problem from occurring.

To use simply one example, a computer model of road and highway usage may be designed to take into account not only hour-to-hour and day-to-day changes in traffic patterns, but also trends in the number of vehicles on the road, shifts in population and employment centers, driver reactions to traffic patterns, and the like. An example of a traffic simulation project is the Intelligent Transportation Systems Centre and Testbed at the University of Toronto. By running such a simulation over a period of (simulated) years (perhaps only hours or days in real time, depending on the complexity of the model), predictions can be made about those roads and highways that are likely to be congested in future years, and highway and roadwork projects can be planned accordingly.

In a manufacturing context, a computer simulation of a manufacturing facility can be constructed and put into (simulated) operation so that potential problems may be identified, and the planned facility redesigned to obviate those problems, before the actual facility is constructed. For example, the layout of the facility might create an unexpected bottleneck. Without such simulation, the real manufacturing facility might be constructed before the problems are identified, at which point modification of the facility to address these problems is likely to be extremely costly. Using simulation allows potential problems to be identified at the design stage, when they can usually be obviated at substantially lower cost.

In order to properly analyze computer models such as those described above, data pertaining to the process (and its component subprocesses) should be presented in a manner that is useful to the end user who is analyzing the process.

As described above, both process modeling and real-world processes that require real-time data presentation are becoming more and more complex, and in many instances consist of hundreds or thousands of sub-steps/nodes. Frequently, computer display animations of the process diagram (whether for a simulated or a real-world process) are used to identify and observe within the computer display bottlenecks, heavy activity regions, or other important process characteristics. Where the process being represented in the computer display is large, there can be a multitude of potentially relevant activities happening simultaneously in various different regions of the process representation in the computer display.

The representation of a large process in a computer display can be problematic. In particular, it can be difficult for users to effectively observe and follow the representation of a large process in a computer display for areas of high interest. This is because the magnitude of the process representation prevents the entire representation from being shown on a typical computer display screen in a large enough size sufficient to enable perception of meaningful data.

More particularly, where a "zoom" capability is used to minimize in the computer display the viewing size of the process artifacts so as to increase the information in the viewing area of the computer display, such scaling efforts greatly reduce the usability of the process representation since the objects become too small to be read within the computer display. One approach that has been used is to permit users to manually scroll vertically and horizontally within the process representation by means of scroll bars within a window, so that they can focus on a particular portion of the process representation. This approach is often cumbersome and inefficient, and creates the risk that a user may fail to observe important data in a portion of the process representation that is not within the current viewing window.

SUMMARY OF THE INVENTION

In one aspect, the present invention is directed toward a computer-implemented method for presenting dynamic data pertaining to a process. The method comprises the steps of receiving region information identifying a plurality of user-selected regions of the process, receiving switching information identifying criteria for switching among the user-selected regions, receiving dynamic data pertaining to the process, and using the dynamic data, region information and switching information to generate a dynamic visual representation of the process. The dynamic visual representation of the process emphasizes, at any given time, only one of the user-selected regions and includes dynamic data corresponding to the region being emphasized, with the user-selected region emphasized at any given time being automatically determined according to the criteria for switching.

In one embodiment, the relevant user-selected region is emphasized by causing that region to substantially monopolize the dynamic visual representation of the process. In another embodiment, the dynamic visual representation comprises a plurality of region displays each corresponding to one of the user-selected regions, and the relevant user-selected region is emphasized by causing the region display corresponding to that user-selected region to be larger than any other region display. In a further embodiment, the dynamic visual representation comprises a plurality of region displays each corresponding to one of the user-selected regions, and the relevant user-selected region is emphasized by causing the region display corresponding to that user-selected region to be visually superimposed over at least one of the other region displays. In a still further embodiment, the relevant user-selected region is emphasized by use of color. In yet a further embodiment, the relevant user-selected region is emphasized by use of animation.

In another aspect, the present invention is directed to a computer-implemented method for presenting dynamic data pertaining to a process. The method comprises the steps of receiving region information identifying at least one user-selected region of the process, receiving dynamic data pertaining to the process, and using the dynamic data and region information to generate a dynamic visual representation of at least a portion of the process containing the at least one user-selected region. The visual representation emphasizes the at least one user-selected region within the context of the portion of the process and includes dynamic data corresponding to each respective user-selected region.

In one embodiment, the at least one user-selected region is emphasized by being larger in size than any non-user-selected region. Preferably, each user-selected region comprises one or more process artifacts, and each user-selected region is made larger in size than any non-user-selected region by making at least one of the process artifacts within each such user-selected region larger than any process artifacts in any non-user-selected region. In another embodiment, each user-selected region is emphasized by use of color. In yet another embodiment, each user-selected region is emphasized by use of animation.

In one particular embodiment, the at least one user-selected region is a plurality of user-selected regions, and the method further comprises receiving switching information identifying criteria for switching among the user-selected regions. The dynamic visual representation provides additional emphasis emphasizing, at any given time, only one of the user-selected regions, with the user-selected region that is additionally emphasized at any given time being automatically determined according to the criteria for switching.

In other aspects, the present invention is directed to computer program products and data processing systems for implementing the above-described methods.

BRIEF DESCRIPTION OF THE DRAWINGS

The novel features believed characteristic of the invention are set forth in the appended claims. The invention itself, however, as well as preferred modes of use, and further objectives and advantages thereof, will best be understood by reference to the following detailed description of an illustrative embodiment when read in conjunction with the accompanying drawings, wherein:

DETAILED DESCRIPTION OF PREFERRED EMBODIMENTS

Figure 1:
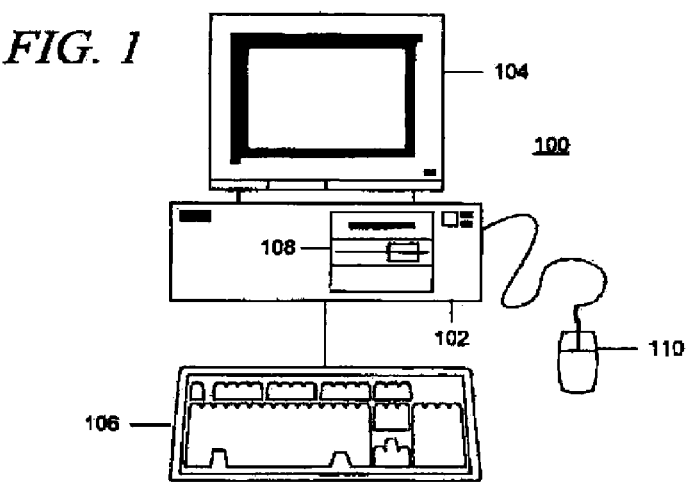
FIG. 1 is a pictorial representation of a data processing system in which aspects of the present invention may be implemented.

FIG. 1 is a pictorial representation of a data processing system in which aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 may be implemented using any suitable computer, such as an IBM® eServer™ computer or IntelliStation® computer, which are products of International Business Machines Corporation, located in Armonk, N.Y. Although the depicted representation shows a personal computer, exemplary aspects of the present invention may be implemented in other types of data processing systems, such as laptop computers, palmtop computers, handheld computers, network computers, servers, workstations, cellular telephones and similar wireless devices, personal digital assistants and other electronic devices on which software programs may be installed. Computer 100 also preferably includes a graphical user interface (GUI) that may be implemented by means of systems software residing in computer readable media in operation within computer 100.

Figure 2:
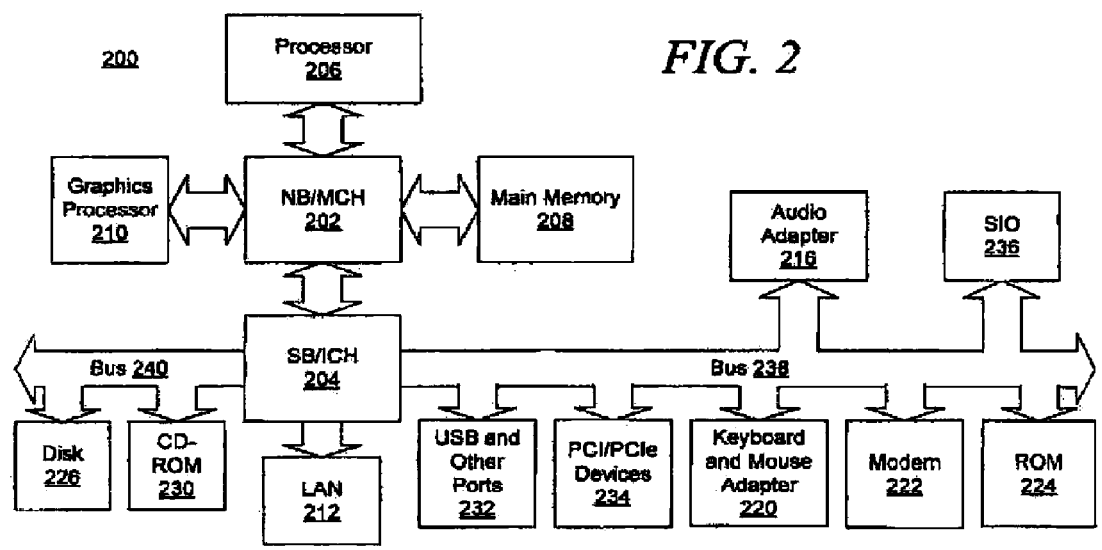
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as personal computer 100 in FIG. 1, in which code or instructions implementing the processes of the exemplary aspects may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH 202 through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 424, universal serial bus (USB) ports and other communications ports 232, and PCI/PCIe devices 234 connect to south bridge and I/O controller hub 204 through bus 238. Hard disk drive (HDD) 226 and CD-ROM drive 230 connect to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. (Java and all Java-based trademarks are trademarks of Sun Microsystems, Inc. in the United States, other countries, or both.)

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which may be configured with flash memory to provide non-volatile memory for storing operating system files and/or user-generated data. A memory may be, for example, main memory 208 or a cache such as found in north bridge and memory controller hub 202. A processing unit may include one or more processors. The depicted examples in FIGS. 1-2 and above-described examples are not meant to imply architectural limitations. As used herein, the terms "data processing system" and "computer system" are intended to have a broad meaning, and may include personal computers, laptop computers, palmtop computers, handheld computers, network computers, servers, mainframes, workstations, cellular telephones and similar wireless devices, personal digital assistants and other electronic devices on which computer software may be installed.

Figure 3:
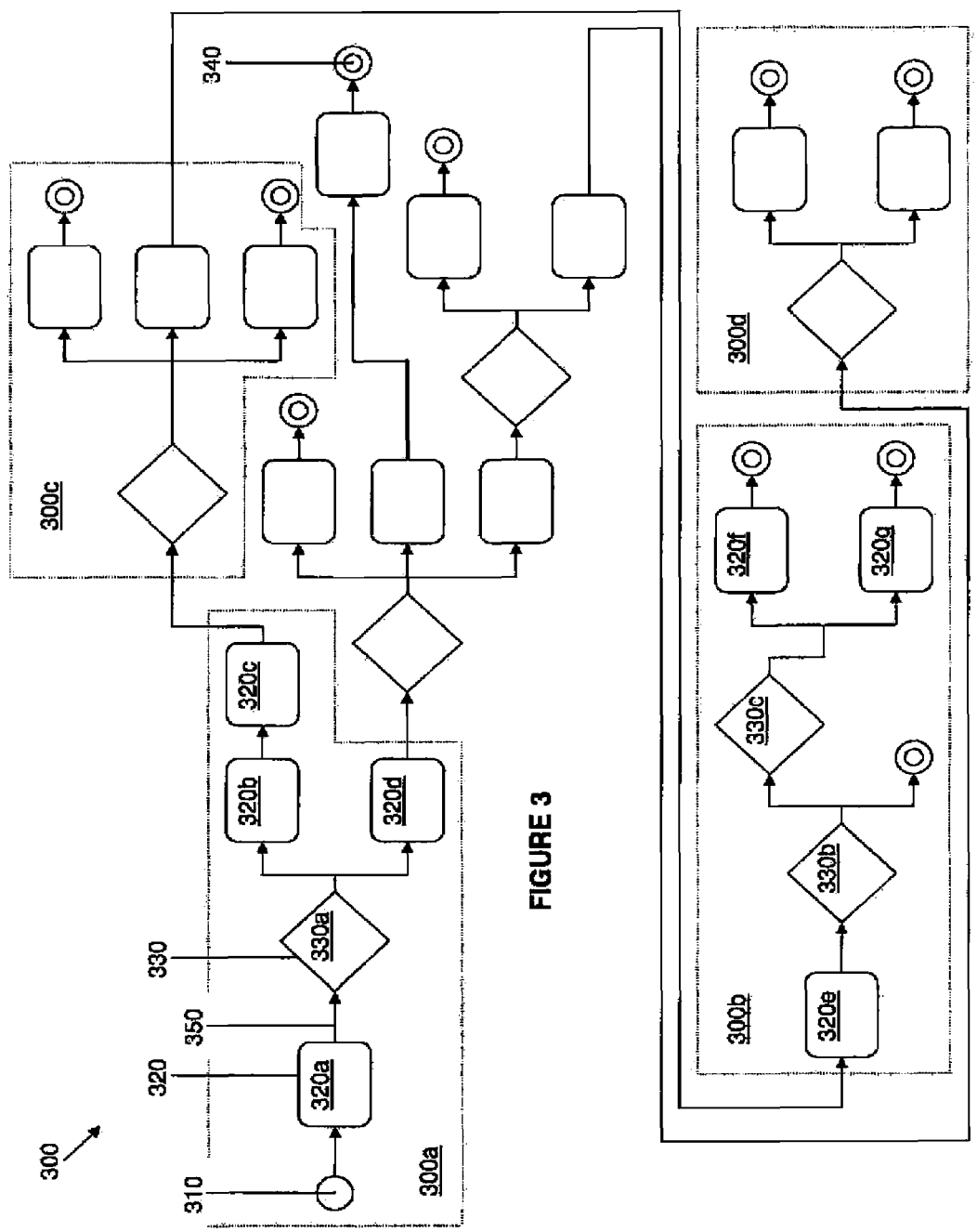
FIG. 3 is an exemplary process representation according to an aspect of the present invention.

With reference now to FIG. 3, an exemplary process representation is shown generally at 300. Process representation 300 comprises a start node 310, a plurality of action nodes 320, a plurality of decision nodes 330, a plurality of end nodes 340, and a plurality of connection arrows 350 showing the flow of the process among the action nodes 320, decision nodes 330, and end nodes 340. In order to maintain simplicity in the Figures, only certain instances of these nodes and connection arrows are labeled.

Process tokens (e.g. tokens representing persons, products being manufactured, etc.) (not shown) proceed through the process model along various paths, depending on how they are directed by the decision nodes 330. Action nodes 320 typically have a time requirement (which may be variable), and a limit as to the number of process tokens that can be handled simultaneously. A process token will not proceed past a particular action node until the time required for the action represented by the node has passed. Accordingly, action nodes 320 typically can hold a queue of process tokens that are waiting to be handled. Decision nodes 330 also typically have a time requirement, and will also direct a process token along one of a plurality of paths. Where a process representation is of a process simulation, decision nodes will typically use statistical modeling to determine which path along which a particular process token will be directed. In the case of a representation of a real-world process, sensors or other monitoring technology may be used to determine the actual path followed by a particular item (or individual) of interest.

Process representation 300 is suitable for representing a simple business process, such as a process of service in a fast food restaurant. (It will be noted here that the example which follows has been simplified considerably from what would be expected for a real fast food service process, in order to facilitate ease of explanation. In addition, explanation of certain portions of the process model is omitted for brevity. Furthermore, it should be noted that while process representation 300 is a particular type of process representation, the present invention is not limited in its application to process representations of this type and may in fact be applied to a wide variety of other types of process representations not depicted herein.)

Referring first to region 300a of process representation 300, action node 320a could represent the entry of a customer into the restaurant and self-orientation by the customer to locate and approach the order counter. After expiry of the time (actual or simulated) for this action, the process token representing the customer would proceed to decision node 330a. Decision node 330a could represent a customer service representative greeting the customer and asking the customer whether the customer wishes to consume his or her meal in the restaurant or carry his or her meal away. If the customer chooses to eat in the restaurant, the process token representing the customer is directed by decision node 330a along a first path to action node 320b, which could represent the time required to place a tray on the counter, and then to action node 320c, which could represent the time required to place a disposable placemat on the tray. If the customer chooses to take his or her meal away, the process token representing the customer would be directed by decision node 330a along a second path to action node 320d, which could represent the time required for the customer service representative to obtain a bag. (As noted above, exemplary fast food service process 300 is simplified for purposes of explanation; in an actual fast food service process placement of a bag would likely be deferred until the size of the order was known.)

Referring now to region 300b of process representation 300, action node 320e could represent a customer service representative advising a customer of the total cost of the order. Decision node 330b could represent a contest wherein every one thousandth ($1000^{th}$) customer receives his or her meal for free, such that the process ends upon a determination that a customer is a one thousandth customer, and therefore need not pay for the meal. Assuming a determination that the customer is not a one thousandth customer, the process continues to decision node 330c, which could represent the customer service representative asking the customer if he or she wishes to pay by cash or by debit card, and a customer response to this inquiry. Accordingly, action node 320f would represent processing of payment by cash, and action node 320g would represent processing of payment by debit card. In each case, the process would end following payment.

The exemplary fast food restaurant process representation 300 also includes regions 300c and 300d, each of which includes one decision node, a plurality of action nodes, and two end nodes. For brevity, the details of the nodes and connectors within regions 300c and 300d, and of the remaining portions of the exemplary fast food restaurant process representation 300, are not expressly described or illustrated because the precise particulars of any given process are not relevant to the present invention.

While process representation 300 represents a relatively simple exemplary process created for the purpose of illustration, one skilled in the art will appreciate that a process in association with which aspects of the present invention may be used may be vastly more complicated, such that hundreds or even thousands of physical printed pages would be required to fully map out the process.

In a preferred embodiment of a process representation, each action node and decision node will display certain process-related information about the state of the process. In the case of the fast food restaurant process example depicted in FIG. 3, nodes could display the size of the queue at any given node, and the average time for processing at each node. There is virtually no limit to the type of process related information that can be displayed within, or near, process nodes, with the nature of the information depending on the nature of the process being represented. When displaying such information within or near nodes, if the process representation is too small, a user may not be able to perceive or comprehend the information presented, or else may have to zoom in on a node (or group of nodes) of interest, to the exclusion of other nodes (or groups of nodes).

In many instances, it may be that only certain regions of a process representation (such as process representation 300) are of interest to a user of a computer program displaying data about the process. For example, with reference to FIG. 3, it may be that only regions 300a and 300b are of interest to a user. Accordingly, one aspect of the present invention is directed toward the provision of visual representation options enabling a user to identify criteria that are of particular interest, so that a system showing a representation of the process can automatically display a particular region of interest without user intervention.

In one embodiment of an aspect of the present invention, a computer system is used to implement a method for presenting dynamic data pertaining to a process. A user can provide, and the computer system would receive, region information identifying a plurality of user-selected regions of the process. The term "region", as used herein, refers to a collection of artifacts, such as (but not limited to) action nodes and decision nodes, within a process representation. Preferably, regions are user-created objects assembled by a user selecting adjacent artifacts within the process representation. Thus, an entire process may be divided into a plurality of regions, which may be overlapping or, more typically, non-overlapping. Alternatively, a user may only define a few regions, with the remainder of the process representation not being defined by the user into regions.

For example, region 300a in FIG. 3 comprises start node 310, action nodes 320a, 320b, 320c and 320d, and decision node 330a, and can be viewed as representing an "initial greeting" region of a fast food process representation. Analogously, region 300b in FIG. 3 comprises action nodes 320e, 320f and 320g, decision nodes 330b and 330c, and three end nodes, and can be viewed as representing a "receive and process payment" region of a fast food process representation. A user can define a region by, for example, using a mouse or other input device to draw a box around the process artifacts of interest or by clicking on individual process artifacts. In a preferred embodiment, a software-implemented region object is created for each user-defined region, and keeps track of all process activities that occur within a region. Thus, process events and activities occurring within these regions are collected. Such process events and activities may include at least the following:

a token enters the input queue of an action or decision node and accumulates within the queue;

a token exits the queue, enters the action node or decision node and an action or decision instance is instantiated for the token;

an action or decision is executing, resource is (or may be) consumed and output is (or may be) generated;

an action or decision instance is completed and disposed of, and the token exits the action or decision node; and a token traverses one of the connections among the task and decision nodes.

Preferably, an implementation of a process representation according to an aspect of the present invention will enable a user to update properties for the region by, for example, enabling or disabling active status for the region, assigning a category to the region, assigning a priority to the region, and the like. These settings can further increase the effectiveness of aspects of the present invention in filtering out unwanted information during rendering of the process representation.

According to an aspect of the present invention, the user will provide the computer system with, and the computer system will receive, switching information identifying criteria for switching among the user-selected regions. Preferably, an implementation of a process representation according to an aspect of the present invention will support user-definition of the relevant criteria, for example through a graphical user interface or a specialized programming language (or both). Optionally, policies can be defined within a computer program that implements aspects of the present invention to group different criterion to better manage the region selection objective. Thus, predefined policies may be provided for the user to select, or the user can define customized policies based on new criteria and/or combinations of new criteria with existing policies.

Either on an ongoing basis or at various trigger points, a computer system implementing aspects of the invention will analyze the collected data for each region and will identify the region with the collected data that most closely matches the user's criteria for switching. The computer system will then modify the process representation display to emphasize the identified region. The trigger points for analyzing the collected data for each region can include one or more of the following:

at the conclusion of fixed time intervals;
each time a specific process event occurs (e.g. every time a particular task is instantiated or disposed, etc.); and
in response to a user action.

It will be appreciated that there is a tradeoff between the increased accuracy and responsiveness to be obtained by more frequent analysis of the collected data for each region, and the increased processing resources required to carry out such analysis.

Examples of criteria for switching include, but are not limited to:

a region has the largest number of accumulated process tokens (this may aid in identifying the region that has the most bottlenecks at a certain time);
a region contains the process artifact having the single queue that has the highest number of accumulated tokens (this can assist in identifying the worst bottleneck at a certain time);
a region has the most total active task instances (this can identify the busiest region at a certain time);
a region contains the one single task that has the highest number of active artifact instances (this can identify the busiest task at a certain time);
a region has the most tokens therewithin (where there are multiple tokens traversing, this helps to identify the region that has the most traffic; in a process in which there is only one token flowing, this option helps to follow the token as it traverses the process);
queue size in a particular process artifact exceeds, or falls below, a specified limit, which may be preset or user-defined (this may be useful where a particular process artifact represents a critical task);
average processing time in a particular process artifact exceeds, or falls below, a specified limit, which may be preset or user-defined (this can be used to identify possible bottlenecks);
processing time for a particular token in a particular process artifact exceeds, or falls below, a specified limit, which may be preset or user-defined (this may be useful where certain artifacts represent critical tasks);
the total number of tokens within a region exceeds, or falls below, a specified limit, which may be preset or user-defined (this can help identify when a region's resources are being exceeded or underutilized);
entry of a specialized token type into a particular region (or a particular process artifact within a region);
routing of a token along a particular path by a decision node (this can be used to identify important events that should be monitored); and
entry of a token into a particular end node.

In addition, combinations of the above events may be specified as criteria for switching. There are other criteria possible, such as the region that generates the most profit, consumes the most of a certain type of resource, etc. There is virtually no limit to the criteria for switching that may be defined and/or selected by the user, and the criteria will depend on the nature of the process being represented.

A computer system implementing a process representation according to an aspect of the present invention will receive dynamic data pertaining to the process. In the case of a process simulation, this will be data provided by a computer system running the simulation, which may be the same computer system that is implementing the process representation, or a different computer system. In the case of a real-world process, the data would come from the process itself, for example from an array of sensors or other monitoring technology that is tracking the process.

According to an aspect of the present invention, a computer system implementing the process representation will use the region information, switching information and dynamic data to generate a dynamic visual representation emphasizing, at any given time, only one of the user-selected regions and including dynamic data corresponding to the region being emphasized. As described above, the computer system uses the criteria for switching to automatically determine the user-selected region to be emphasized at any given time.

Figure 4:
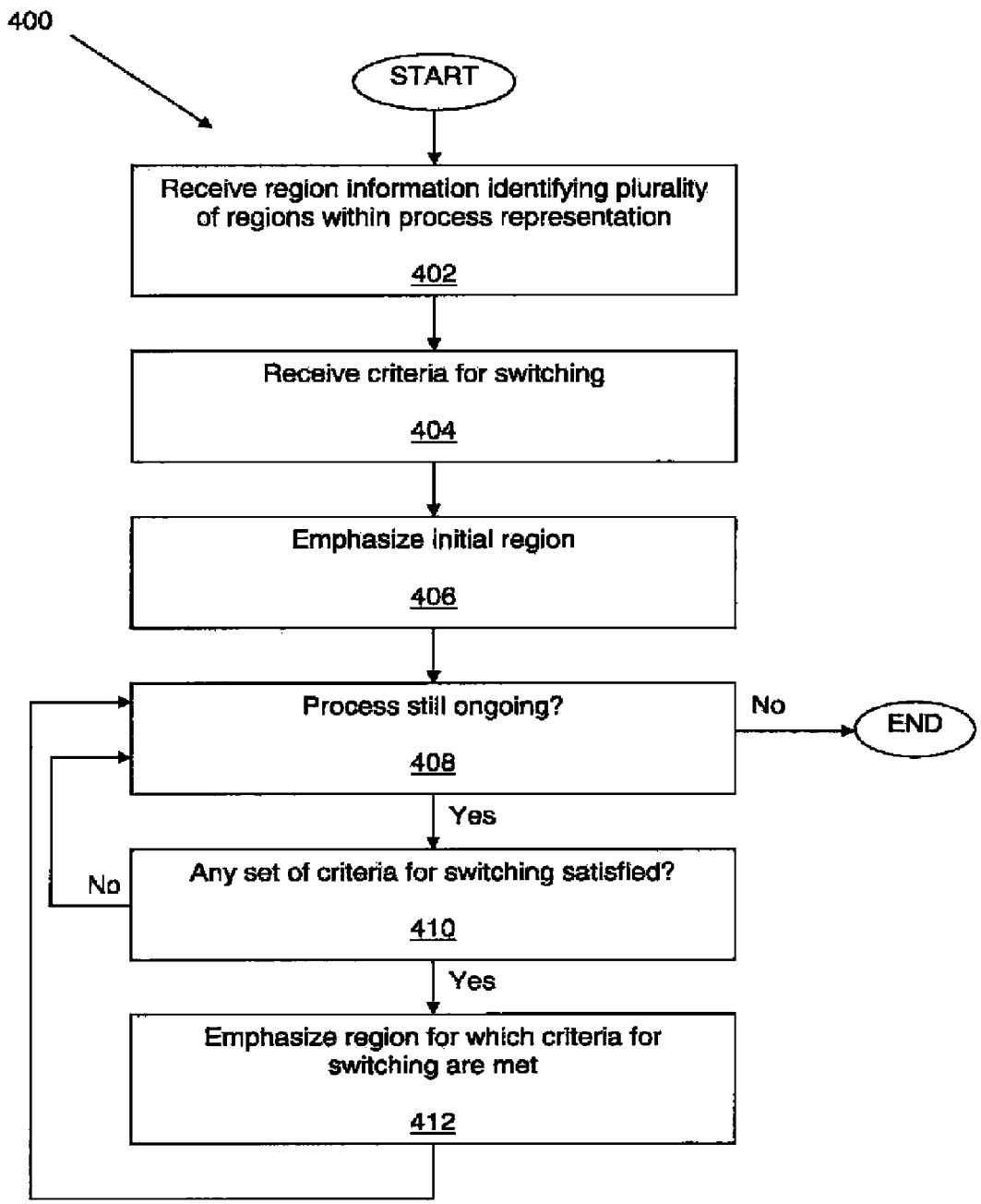
FIG. 4 is a flow chart showing a method according to an aspect of the present invention.

With reference now to FIG. 4, an exemplary method according to an aspect of the present invention is shown generally at 400.

At step 402, the computer system receives region information identifying a plurality of regions of the process representation. Preferably, the computer system will prompt the user for this information, and the user will input this information by way of a graphical user interface (GUI) implemented in the software that supports the process representation.

At step 404, the computer system implementing the process representation will receive criteria for switching from the user. As noted above, the criteria for switching may be based on virtually any combination of measurable process attributes. The criteria for switching will preferably specify, either implicitly or explicitly, an initial region to emphasize, and at step 406, the computer system will emphasize the initial region.

At step 408, the computer system implementing the process representation continuously checks to see that the process (simulated or real) is continuing (i.e. has not ended). If the process has ended, then the computer system implementing the process representation will terminate the method 400. If the process is ongoing, then at step 410 the computer system checks to determine whether any particular set of criteria for switching are satisfied. This may be a complex process, since different regions may have different criteria for switching, and may have different user-specified priorities for switching as well. If any set of criteria is satisfied (other than for the currently emphasized region), then at step 412, the computer system will switch to emphasizing the region for which the criteria for switching were satisfied, and will then return to step 408 to check whether the process has ended, and, assuming that the process is ongoing, proceed again to step 410 to check whether another criteria for switching is satisfied. It will be appreciated that in certain embodiments, step 408 may optionally be omitted. For example, a separate aspect of the computer software implementing the process representation may monitor for whether the process has ended, and provide a break instruction to the process 400 when the process being represented ends. It will also be appreciated that the order of steps 408 and 410 may optionally be reversed. In addition, the order of steps 402 and 404 may in certain instances be reversed, as long as appropriate accommodations are made for the fact that such a reversal means that a user would have to specify the criteria for switching before specifying the regions of interest.

There are numerous ways in which a computer system implementing aspects of the present invention can emphasize one particular region over another.

Figure 5A:
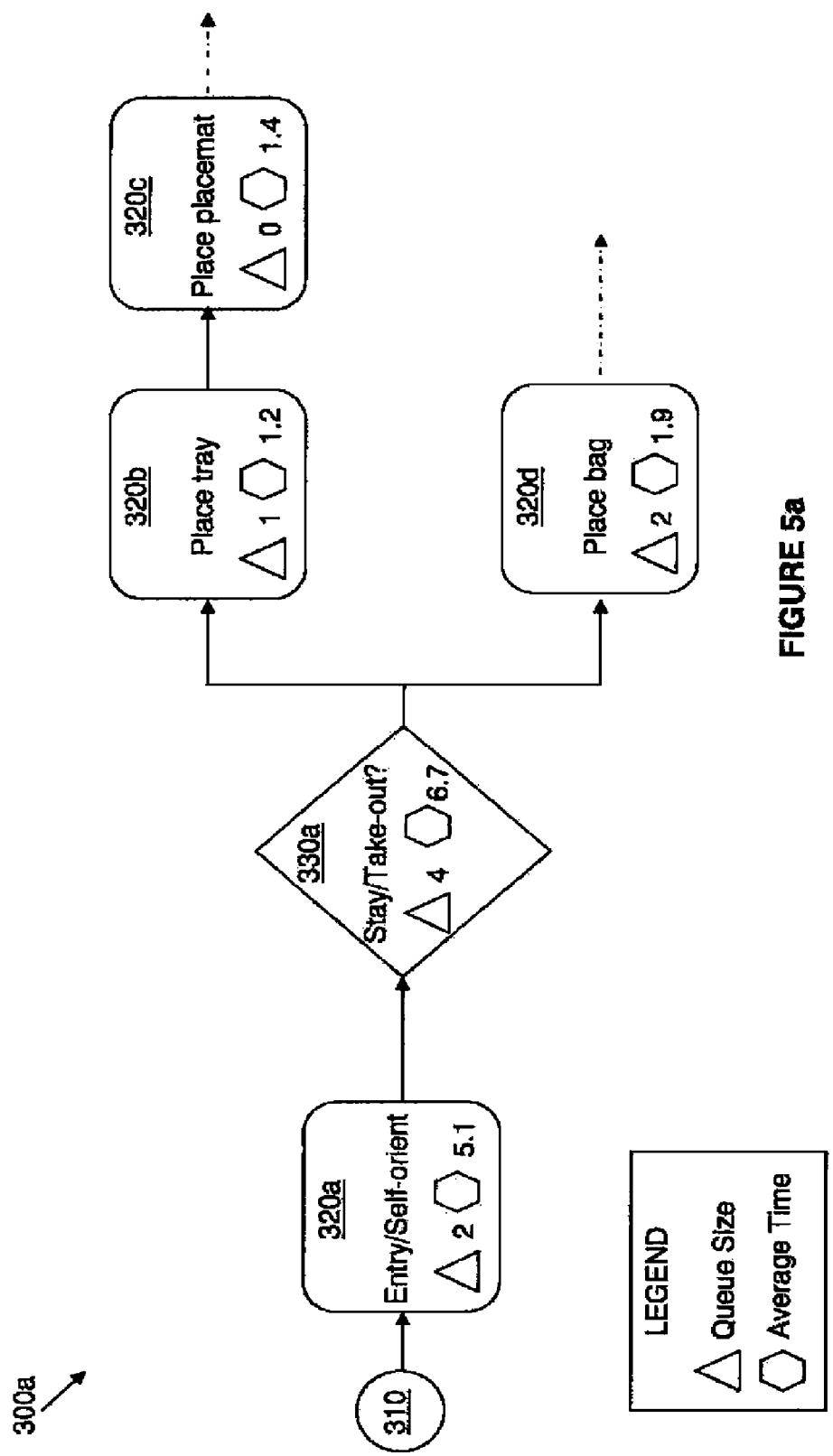
FIG. 5a is a first instance of a first exemplary visual display according to an aspect of the present invention.

In one embodiment, the system emphasizes the user-selected region by including only dynamic data corresponding to that user-selected region. By reference to the exemplary process representation shown in FIG. 3, region 300*a* may initially be emphasized according to the criteria for switching, for example because the user has specified region 300*a* as the initial region to be emphasized. Thus a visual display for the computer system would comprise a dynamic visual representation showing only that region; i.e. the dynamic visual representation shown on the display would be substantially identical to FIG. 5*a* so that the display of region 300*a* substantially monopolizes the visual display.

Figure 5B:
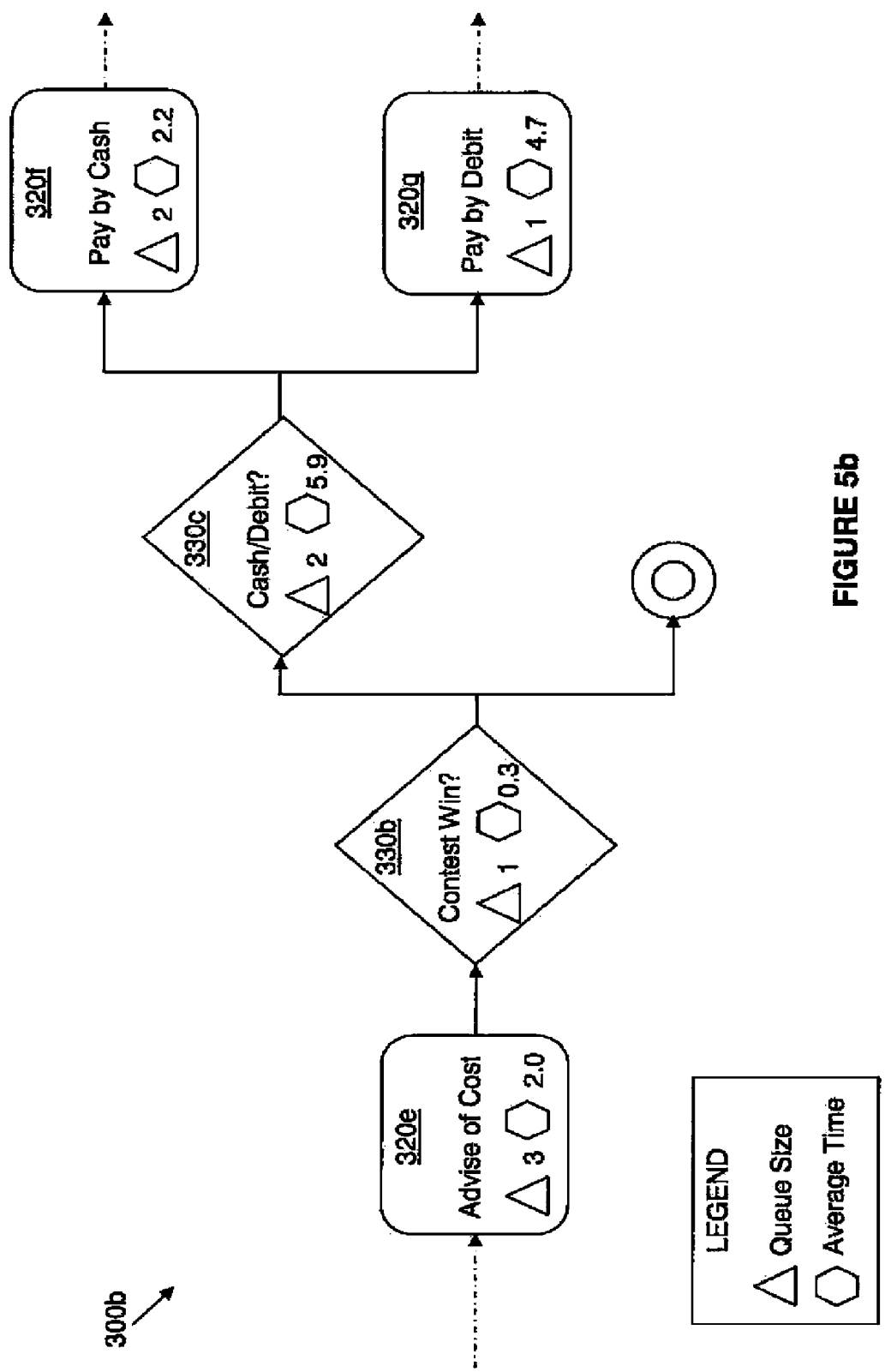
FIG. 5b is a second instance of a first exemplary visual display according to an aspect of the present invention.

At some point during the process, based on the continuously incoming dynamic data pertaining to the process, and according to the criteria for switching, the computer system may determine that region 300*b* should be emphasized instead of region 300*a*. For example, a particular decision may be taken at decision node 330*b*. Accordingly, the computer system would change the output to the visual display so that only region 300*b* was emphasized; that is, the dynamic visual representation shown on the display would be substantially identical to FIG. 5*b*, with region 300*b* substantially monopolizing the visual display.

At some further point in the process, the computer system may determine, based on the continuously incoming dynamic data pertaining to the process, and according to the criteria for switching, that region 300*a* should again be emphasized, for example because the average processing time in action node 320*b* exceeds a specified limit. The computer system would again change the output to the visual display so that only region 300*a* was emphasized and the dynamic visual representation shown on the display would revert to one substantially identical to FIG. 5*a*. The process of switching between regions based on the continuously incoming dynamic data pertaining to the process, and according to the criteria for switching, may continue indefinitely for as long as the process is ongoing.

A computer system implementing aspects of the present invention may switch emphasis between user-selected regions (such as exemplary regions 300*a* and 300*b*) by substantially instantaneously changing the view presented by the visual display, or by causing the visual display to scroll along the process representation from the formerly emphasized region to the newly emphasized region. Although not shown in the Figures, where such scrolling is used, in certain instances a small portion (e.g. one or a few process artifacts) of another region may remain within the view presented by the visual display even though a particular region is being emphasized (by substantially monopolizing the display area).

In alternative embodiments according to aspects of the present invention, the dynamic visual representation of the process may comprise a plurality of region displays each corresponding to one of the user-selected regions. In one such alternative embodiment, the user-selected region being emphasized at any given time is emphasized by causing the region display corresponding to the relevant user-selected region to be larger than any other region display.

Figure 6A:
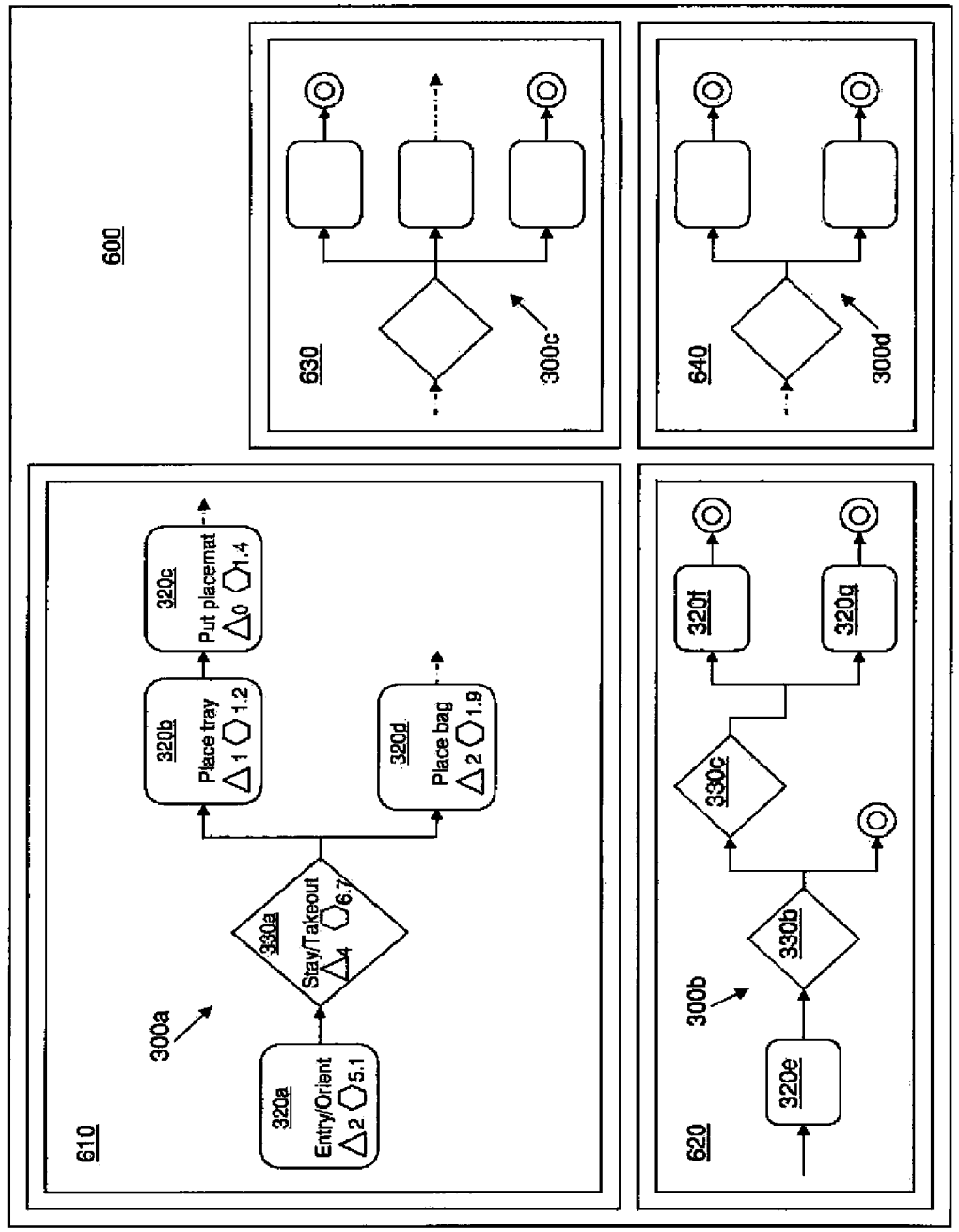
FIG. 6a is a first instance of a second exemplary visual display according to an aspect of the present invention.
Figure 6B:
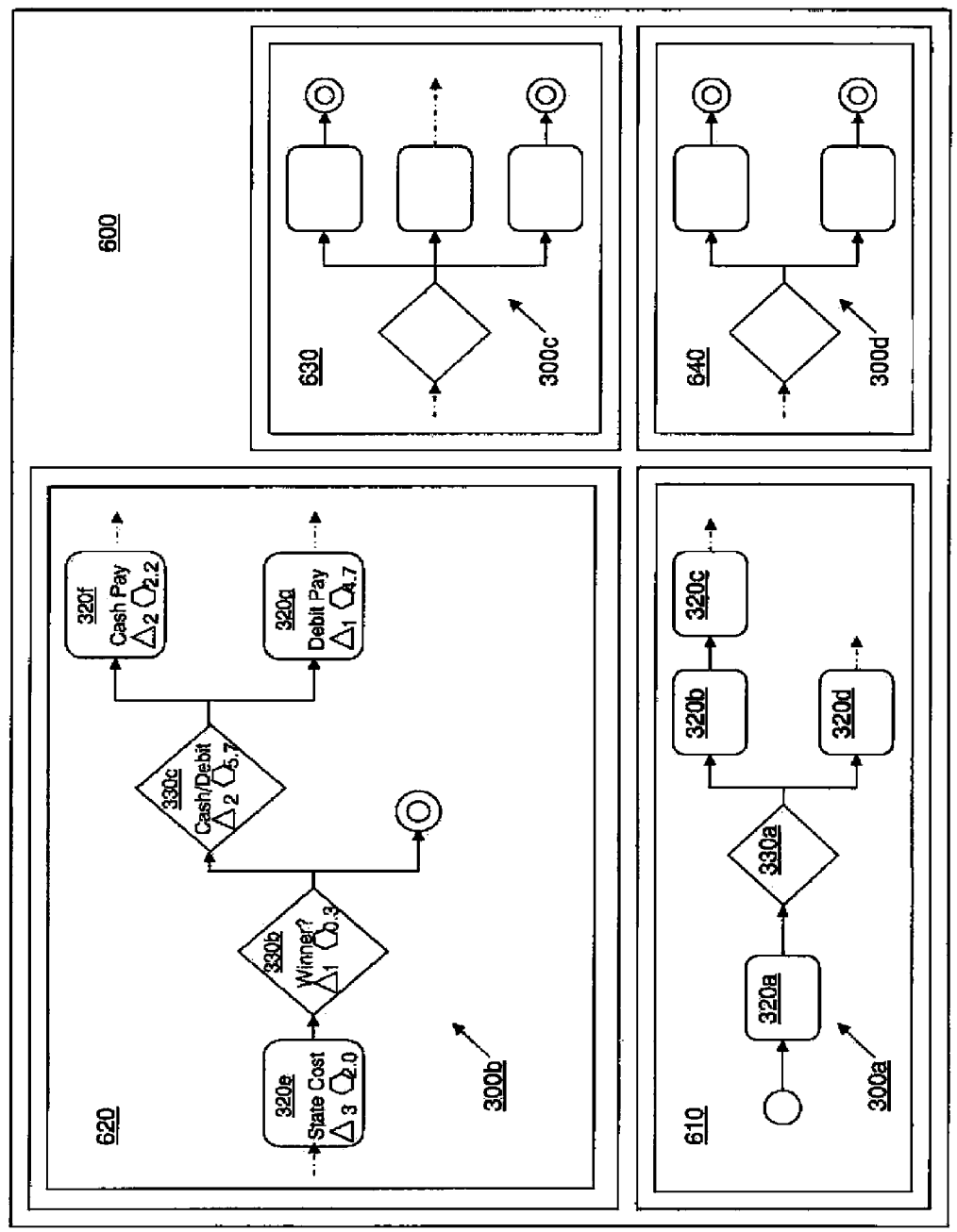
FIG. 6b is a second instance of a second exemplary visual display according to an aspect of the present invention.

With reference now to FIGS. 6*a* and 6*b*, there is shown an exemplary embodiment 600 of a dynamic visual representation of portions of fast food process 300. The exemplary embodiment 600 would be shown on the visual display of a computer system implementing a dynamic visual representation of the exemplary fast food restaurant process representation shown in FIG. 3, in accordance with aspects of the present invention. The exemplary dynamic visual representation of fast food restaurant process representation 300 comprises region displays 610, 620, 630 and 640 corresponding to user-selected regions 300*a*, 300*b*, 300*c* and 300*d*, respectively.

With reference now to FIG. 6*a*, region 300*a* may initially be emphasized according to the criteria for switching, for example because the user has specified region 300*a* as the initial region to be emphasized. Thus, the visual display presented to a user would be substantially identical to FIG. 6*a*. Within FIG. 6*a*, region display 610, corresponding to region 300*a*, is emphasized by being larger than any of the other region displays 620, 630, 640 (corresponding to regions 300*b*, 300*c* and 300*d*, respectively).

At some point during the process, based on the continuously incoming dynamic data pertaining to the process, and according to the criteria for switching, the computer system may determine that region 300*b* should be emphasized instead of region 300*a*. For example, the number of instances of action node 320*e* may exceed a specified limit. Responsive to this determination, the computer system would modify the output to the visual display so that only region 300*b* was emphasized. In the particular embodiment described in the context of FIGS. 6*a* and 6*b*, the dynamic visual representation shown on the display would be substantially identical to FIG. 6*b*, in which region display 620, corresponding to region 300*b*, is larger than any other region display 610, 630, 640.

At a further point during execution of the process, the computer system may determine, based on the continuously incoming dynamic data pertaining to the process, and according to the criteria for switching, that region 300*a* should again be emphasized. For example, one of the criteria for switching may be that the average time taken for traversal of action node 320*b* exceeds a specified value. In response to this determination, the computer system would again change the output to the visual display so that only region 300*a* was emphasized, with the result being that the dynamic visual representation shown on the display would revert to one substantially identical to FIG. 6*a*.

As was noted above in respect of the discussion of FIGS. 5*a* and 5*b*, the process of switching between regions based on the continuously incoming dynamic data pertaining to the process, and according to the criteria for switching, may continue indefinitely for as long as the process is ongoing.

Figure 7A:
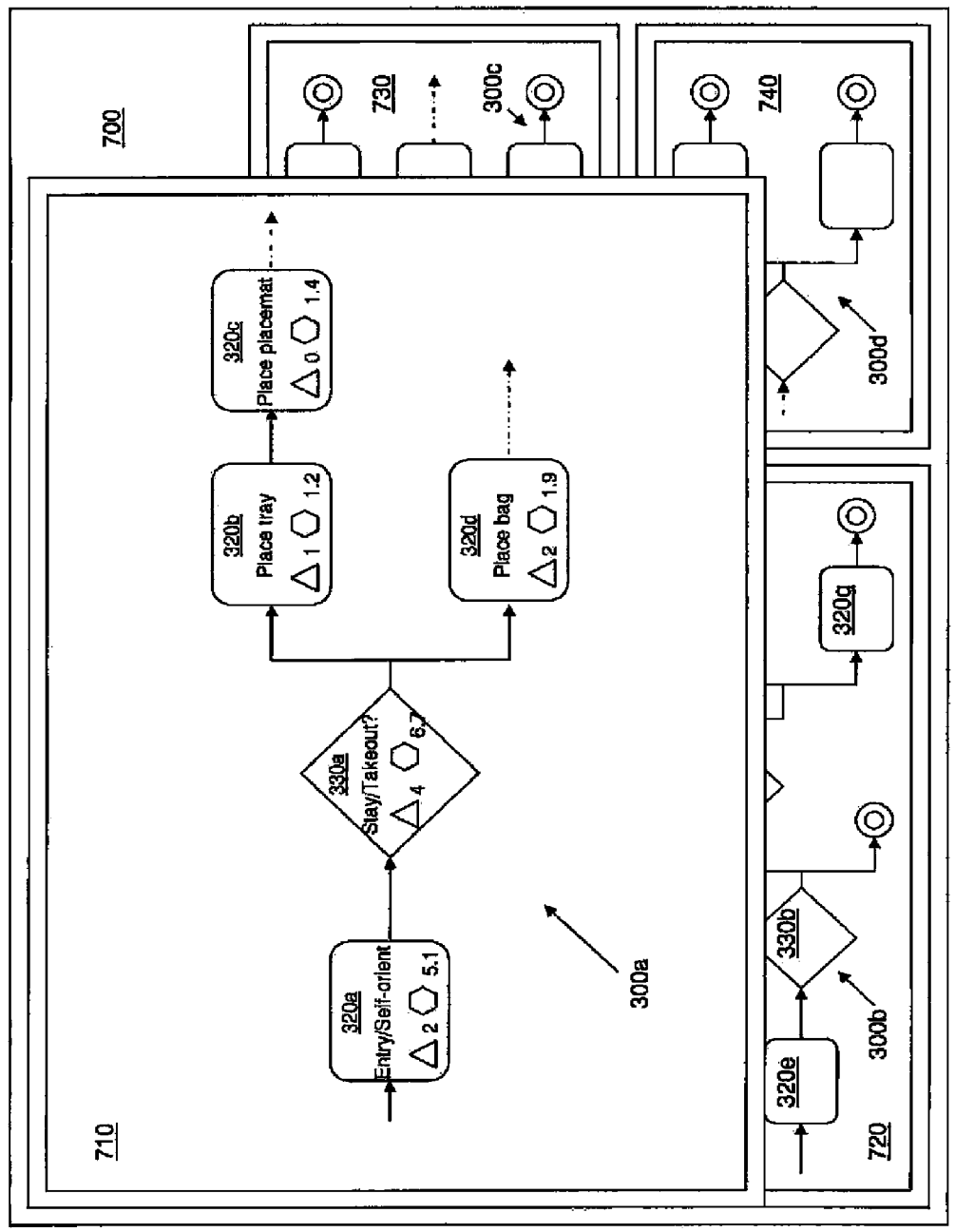
FIG. 7a is a first instance of a third exemplary visual display according to an aspect of the present invention.
Figure 7B:
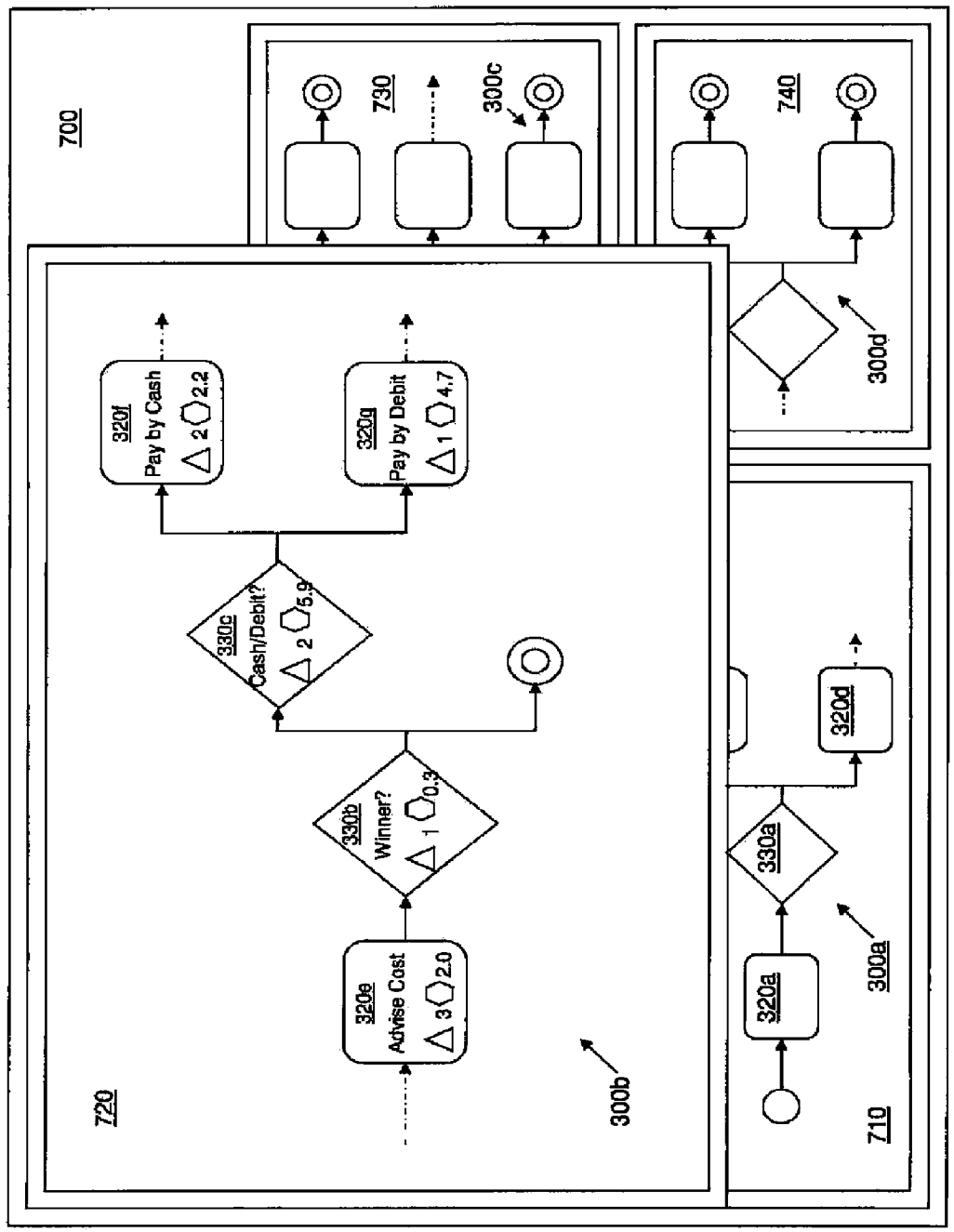
FIG. 7b is a second instance of a third exemplary visual display according to an aspect of the present invention.

In a further embodiment where the dynamic visual representation of the process comprises a plurality of region displays, each corresponding to one of the user-selected regions, the relevant user-selected region is emphasized by causing the region display corresponding to that region to be visually superimposed over at least one of the other region displays. The region being emphasized may be advantageously be superimposed over only a portion of each other region, so that at least a portion of each other region remains visible to a user. Referring now to FIGS. 7*a*, and 7*b*, an exemplary illustration of such an embodiment, in the context of the fast food service process representation described in FIG. 3, is shown generally at 700.

Region 300a may initially be emphasized according to the criteria for switching. This may be because the user has specified region 300a as the initial region to be emphasized, or because region 300a represents the entry point in the process and is therefore the first to satisfy certain criteria for switching, because the nodes in region 300a are the first to be populated as tokens enter the process represented by process representation 300. Where region 300a is emphasized initially, the visual display output by the computer system could be substantially identical to FIG. 7a. Within FIG. 7a, region display 710, corresponding to region 300a, is emphasized by being visually superimposed over the other region displays 720, 730, 740 (corresponding to regions 300b, 300c and 300d, respectively). While FIG. 7a shows region display 710 overlapping all of the other region displays 720, 730, 740, it will be appreciated that a selected region display may be emphasized by overlapping only some of the other region displays, without departing from the scope of the present invention.

As the process progresses, the computer system may determine, based on the continuously incoming dynamic data pertaining to the process, and according to the criteria for switching, that region 300b should be emphasized instead of region 300a. For example, the average time taken to traverse action node 320e may exceed a specified limit. Responsive to this determination, the computer system would modify the output to the visual display so that only region 300b was emphasized. In the particular embodiment wherein regions are emphasized by visually superimposing that region over other regions, the dynamic visual representation shown on the display could be substantially identical to FIG. 7b. Within FIG. 7b, it can be seen that region display 720 overlaps (i.e. is visually superimposed on) region displays 730, 740 and 750.

As the process continues to execute, the computer system may determine, based on the continuously incoming dynamic data pertaining to the process, and according to the criteria for switching, that region 300a should again be emphasized. For example, a predefined number of tokens (or individuals, in the case of a real world process) may have passed through decision node 330a. In response to this determination, the computer system would modify the output to the visual display again, so that now only region 300a would be emphasized, with the result being that the dynamic visual representation shown on the display would revert to one substantially identical to FIG. 7a.

As was noted above in respect of the discussion of FIGS. 5a and 5b and of FIGS. 6a and 6b, the process of switching between regions may continue indefinitely for as long as the process is ongoing.

In further embodiments, the relevant user-selected region may be emphasized by the use of color (for example, the computer system may cause the relevant user-selected region, or artifacts within that region, to appear in a different, preferably more prominent, color from the color of the regions not being emphasized. By way of non-limiting example, the user-selected region being emphasized may be presented in bright red while the regions not being emphasized are presented in a pale blue. Alternatively or in addition, the relevant user-selected region may be emphasized by use of animation. By way of non-limiting example, the background of the region, or artifacts within the region, may be made to flash between two different colors so as to attract attention, or the progress of tokens through, and other activities within, the user-selected region being emphasized may be represented by animation.

Optionally, a single computer program implementing aspects of the present invention may provide a user with the ability to select from more than one technique for emphasizing a selected region. For example, a computer program could allow a user to select from emphasizing a region by showing only that region (as in FIGS. 5a and 5b), by showing that region as larger than the other regions (as in FIGS. 6a and 6b), by having that region overlap at least a portion of at least some other regions (as in FIGS. 7a and 7b), by the use of color, by use of animation, or by any other suitable means.

It will be noted with reference to FIGS. 5a and 5b, 6a and 6b and 7a and 7b that the representations of regions 300a and 300b differ as between the embodiments shown in FIGS. 5a and 5b, 6a and 6b and 7a and 7b. In particular, the text within each process artifact, and the exact layout of the process artifacts, may be slightly different among the different embodiments even though the same region is represented. Preferably, the computer software implementing aspects of the present invention is enabled to make such slight modifications to region layouts so as to facilitate the display and layout of the regions for ease of perception and comprehension.

According to another aspect of the present invention, a computer system implementing that aspect of the invention will receive region information identifying one or more user-selected regions of a process (which may be a simulated process or a real-world process) and will also receive dynamic data pertaining to the process. The computer system will then use the dynamic data and the region information to generate a visual representation of a portion of the process, or the entire process where proper presentation of the entire process is both feasible and desirable. The portion represented will contain the one or more user-selected regions, and will display these regions within the context of the portion of the process (or entire process). The computer system will cause the visual representation to emphasize the one or more user-selected regions, and will include dynamic data corresponding to each respective user-selected region. Thus, a user viewing the visual representation will be not only be able to see the particular portions of the process that are of interest, but will also be able to view those portions in the context of the larger process, potentially enhancing the user's ability to analyze the process information being presented.

Figure 8:
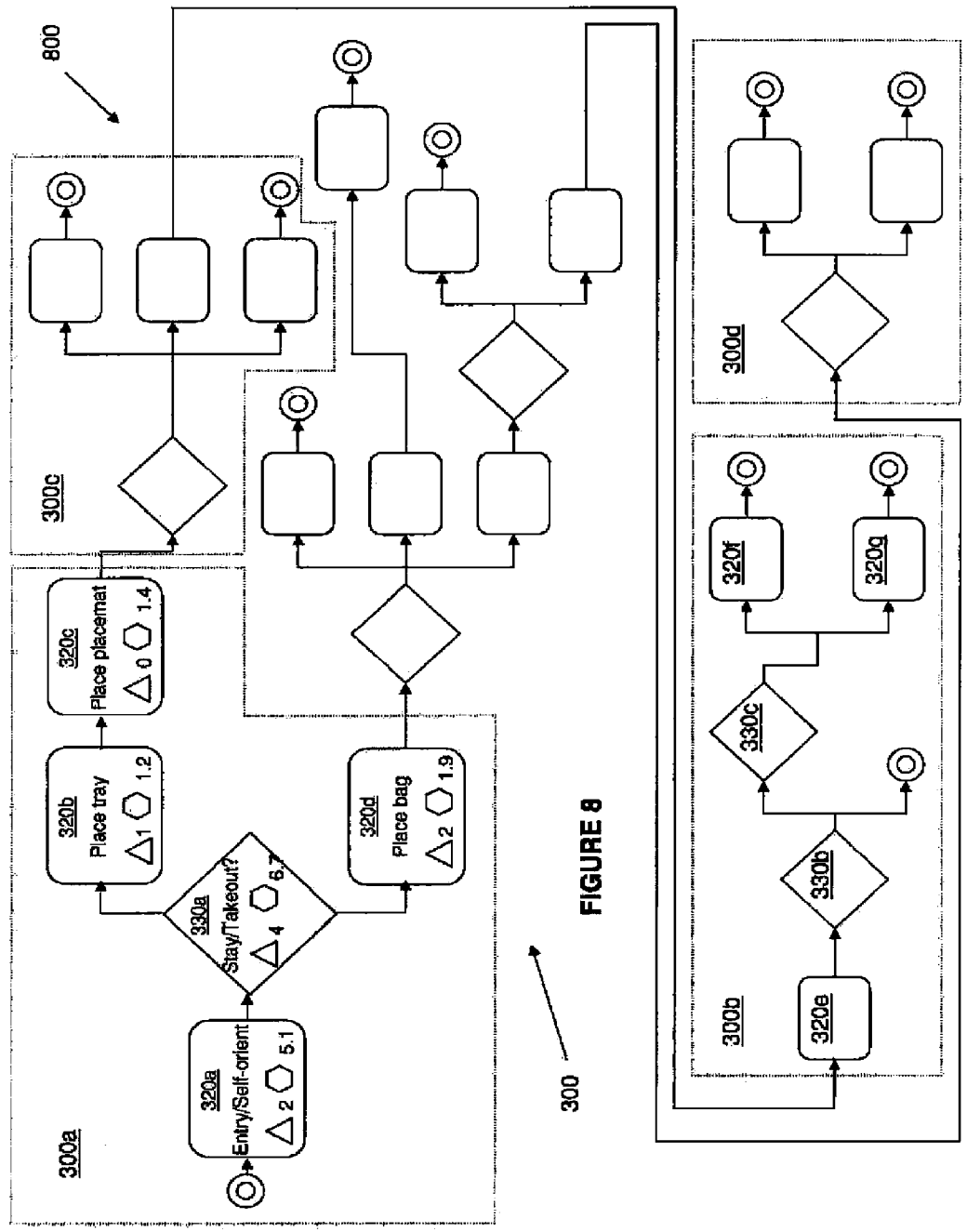
FIG. 8 is a fourth exemplary visual display according to an aspect of the present invention.

With reference now to FIG. 8, a display according to an exemplary implementation of an aspect of the present invention is shown generally at 800. The display 800 shown in FIG. 8 is based upon, and displays the process representation 300 shown in, FIG. 3. In the exemplary display shown in FIG. 8, the user has selected region 300a as a region of particular interest, and will therefore have provided information to the computer system identifying that region. As can be seen in FIG. 8, region 300a is emphasized over the other regions 300b, 300c, 300d by having its constituent process artifacts 320a, 320b, 320c, 320d, 330a appear larger than the process artifacts in the other regions 300b, 300c, 300d. Advantageously, the larger size of the process artifacts enables presentation of additional process details, as shown in FIG. 8. Because the process artifacts of emphasized region 300a are larger than those of non-emphasized regions 300b, 300c, 300d, the connections among these process artifacts have been repositioned to accommodate this increased size within limited visual display space, although without altering the meaning of the emphasized portion 300*a* of the process representation 300. Other means of emphasis, besides a larger size for process artifacts, may be used to emphasize a region within the context of at least a portion of the process representation 300. For example, color or animation may be used.

Figure 9:
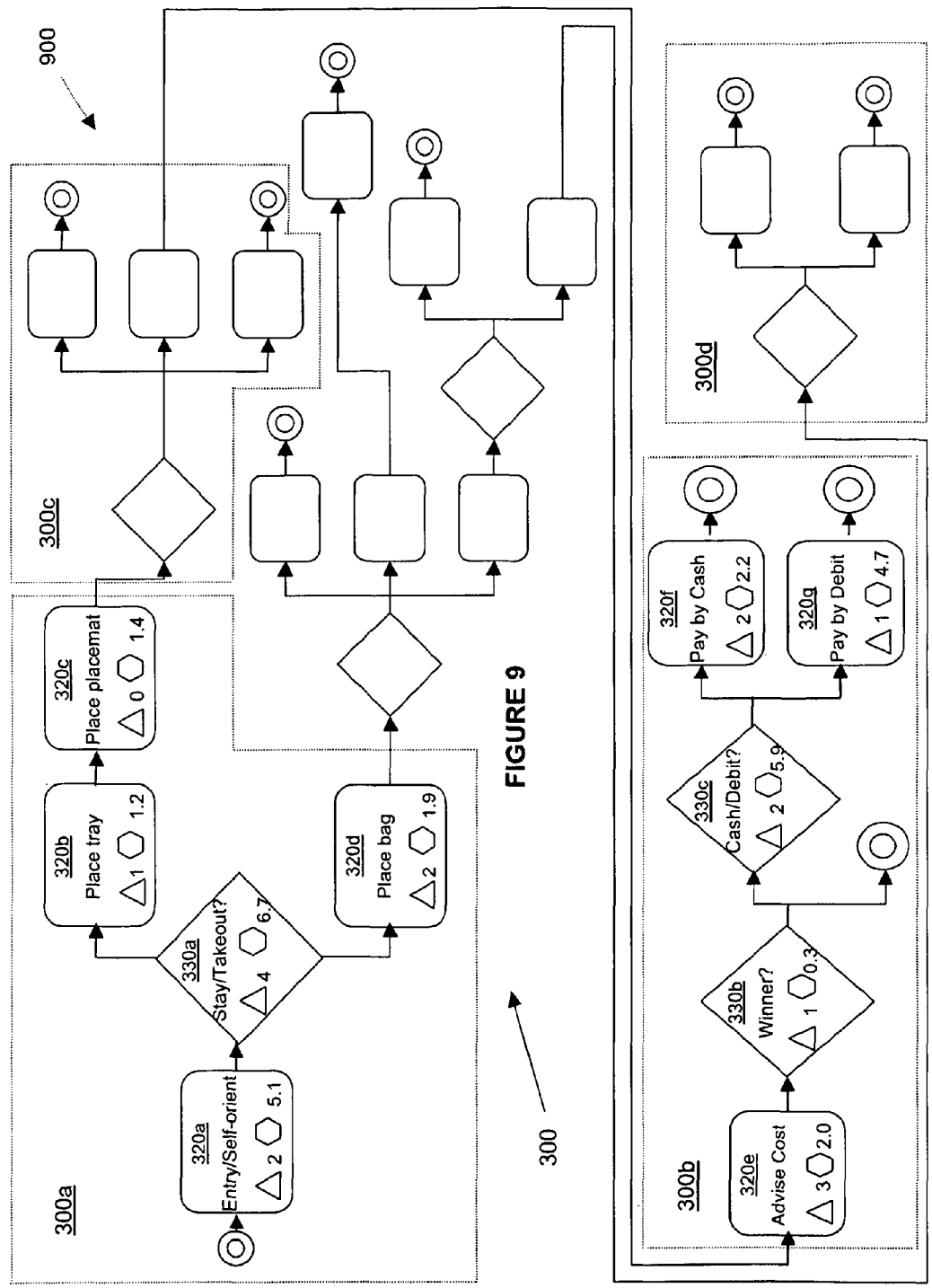
FIG. 9 is a fifth exemplary visual display according to an aspect of the present invention.

According to an aspect of the present invention, more than one region may be emphasized within the context of at least part of the process representation. With reference now to FIG. 9, an exemplary visual display is shown generally at 900. Regions 300*a* and 300*b* are both emphasized within the context of process representation 300 by means of the process artifacts 320*a*, 320*b*, 320*c*, 320*d*, 330*a* for region 300*a*, and the process artifacts 320*e*, 320*f*, 320*g*, 330*b* and 330*c* for region 300*b*, appearing larger than the process artifacts for the regions 300*c*, 300*d* that are not being emphasized.

The aspect of the present invention wherein one or more particular regions are emphasized within the context of at least a portion of the process representation (as shown in FIGS. 8 and 9) and the aspect of the present invention wherein a region is emphasized based on criteria for switching, may comprise a single integrated display. Such an integrated display is shown in FIGS. 10*a* and 10*b*, and is denoted generally by the reference numeral 1000.

Figure 10A:
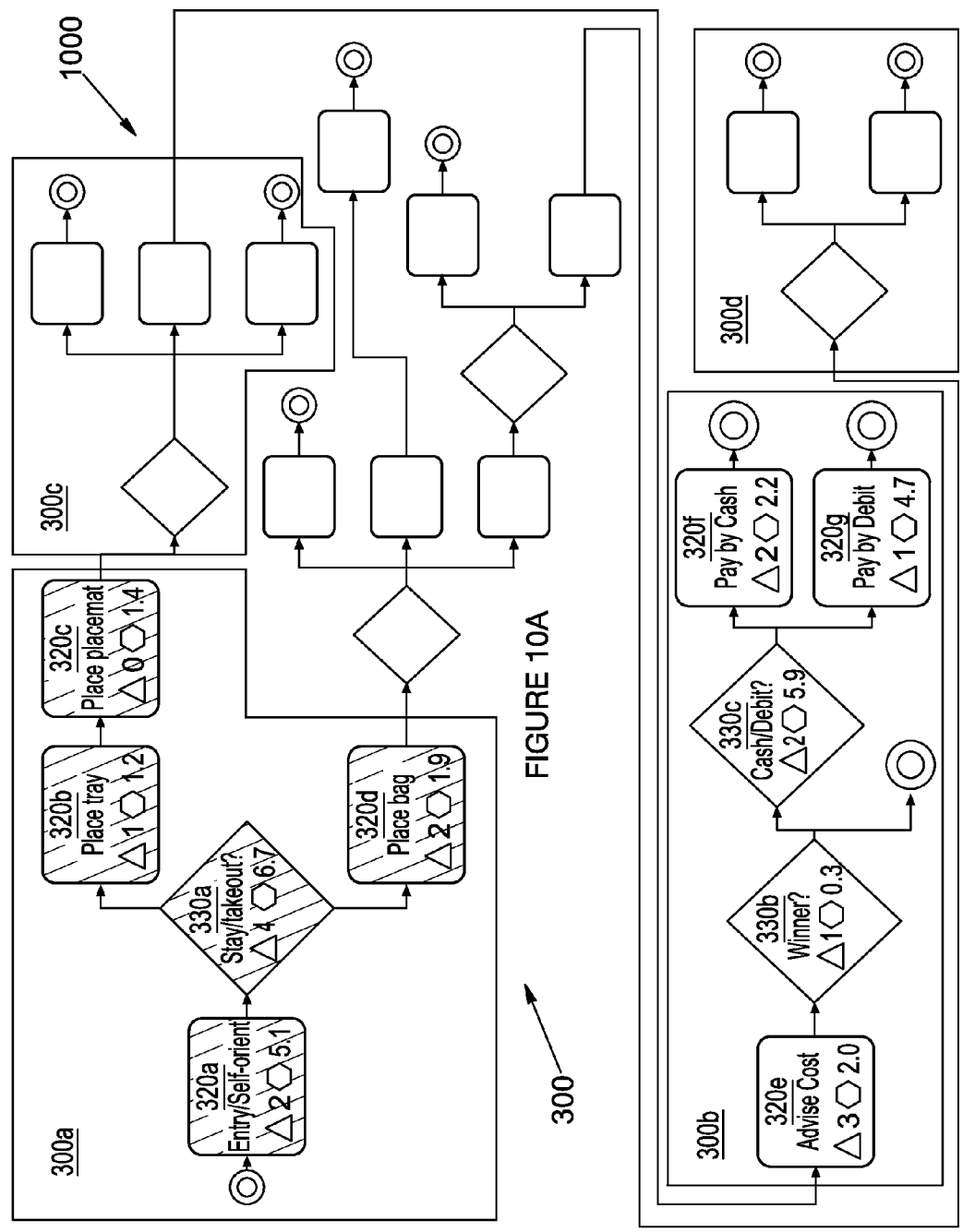
FIG. 10a is a first instance of a sixth exemplary visual display according to an aspect of the present invention.

With reference now to FIG. 10*a*, both regions 300*a* and 300*b* are emphasized within the context of process representation 300 by having their respective process artifacts 320*a*, 320*b*, 320*c*, 320*d*, 330*a* (for region 300*a*) and 320*e*, 320*f*, 320*g*, 330*b* and 330*c* (for region 300*b*) appear larger than the process artifacts for the non-emphasized portions of the visual display. In FIG. 10*a*, region 300*a* best satisfies the criteria for switching and is therefore further emphasized relative to region 300*b*. In particular, process artifacts 320*a*, 320*b*, 320*c*, 320*d*, 330*a* for region 300*a* are further emphasized, relative to process artifacts 320*e*, 320*f*, 320*g*, 330*b* and 330*c* for region 300*b*, by use of color (shown as grey shading in FIG. 10*a*). Other means of emphasizing region 300*a* over region 300*b* may also be used, such as animation, visible borders, having the artifacts within region 300*a* have an even larger size than the artifacts within region 300*b*, or the like.

Figure 10B:
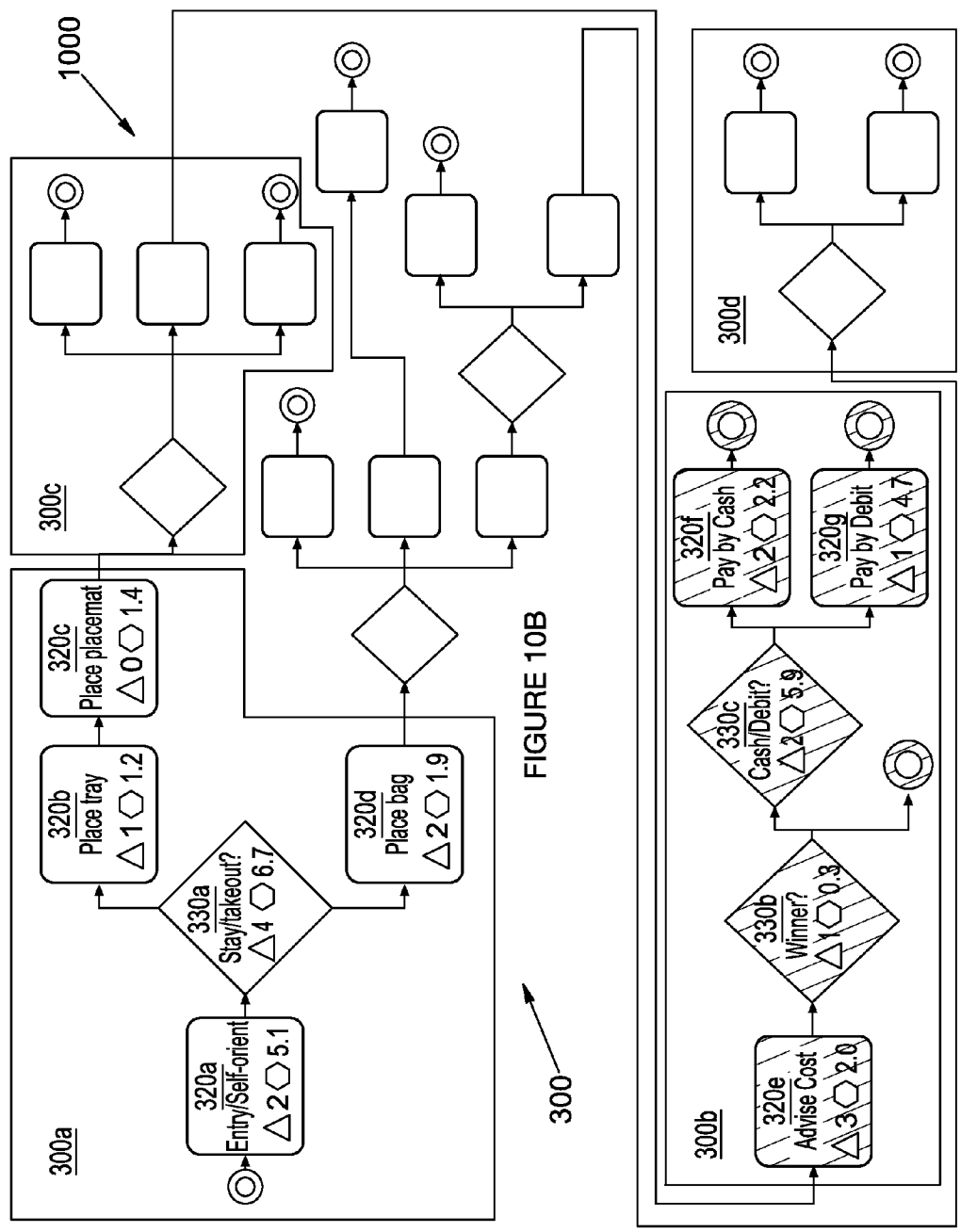
FIG. 10b is a second instance of a sixth exemplary visual display according to an aspect of the present invention.

With reference now to FIG. 10*b*, the computer system has determined, according to the criteria for switching, that region 300*b* should be emphasized instead of region 300*a*. Accordingly, region 300*b* is further emphasized relative to region 300*a*, by use of an emphasizing color (shown as grey shading in FIG. 10*b*) for process artifacts 320*e*, 320*f*, 320*g*, 330*b* and 330*c* for region 300*b*, where such emphasizing color is not used for process artifacts 320*a*, 320*b*, 320*c*, 320*d*, 330*a* for region 300*a*.

Figure 11A:
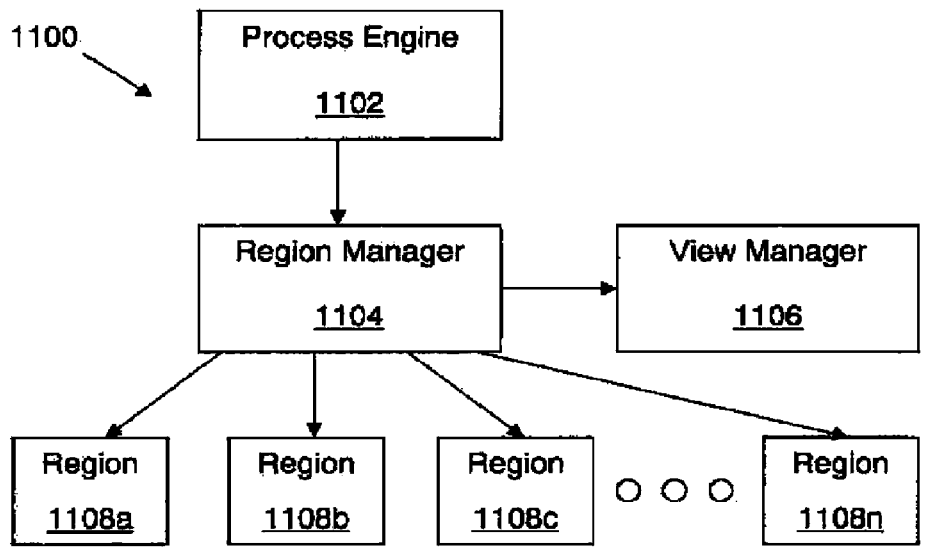
FIG. 11a is a schematic representation of a first exemplary embodiment of an architecture for software implementing aspects of the present invention.

Referring now to FIG. 11*a*, a schematic representation of a first exemplary embodiment of an architecture for software implementing aspects of the present invention is shown generally at 1100. The exemplary architecture 1100 comprises a process engine 1102, a region manager 1104, a view manager 1106 and a plurality of regions 1108*a* to 1108*n*.

As noted above, each region 1108*a* to 1108*n* is a collection of process artifacts, such as (but not limited to) action nodes and decision nodes, within a process representation, and may either be a user-created object or may be predefined for a particular process. A process representation may be divided into a plurality of regions, or there may be only a certain number of regions, with the remainder of the process representation not being defined into regions (or at least not so defined by the user).

The process engine 1102 tracks the status of the various aspects of the process being represented, and passes relevant process information on to the region manager 1104. In the case of a simulated process, the process engine 1102 would typically actually execute the process simulation. In the case of a real-world process, the process engine 1102 would receive process data (for example, from an array of sensors or other monitoring technology) and would analyze and correlate the data to generate process information that would then be passed on to the region manager 1104.

The region manager 1104 receives information from the process engine 1102, and then uses this information to generate the process data that will be presented by each region within the visual aspect of the process representation. Where only part of the process representation has been classified into regions, the region manager 1104 can group the unclassified portions of the process representation into one or more "virtual regions" or, alternatively, may treat each process artifact that is not part of a user-defined region or pre-defined region as a separate "virtual region", to facilitate management of data presentation. The region manager 1104 also contains the logic used to identify the region that is the best match for the user-defined criteria for switching.

The view manager 1106 controls the view of the process representation that is presented to the user, and is responsible for adjusting the visual display to emphasize the region 1108 identified by the region manager 1104 as best matching the criteria for switching specified by the user. Preferably, the view manager 1106 will centralize the currently emphasized region 1108 in the viewing area. The view manager 1106 is also (or alternatively) responsible for emphasizing one or more regions within the context of at least a portion of the process representation.

The view manager 1106 may optionally calculate a "scroll path" for transitioning to the new region to be emphasized, that is, rather than simply switching between regions, the view manager 1106 may cause the visual display to scroll along the process representation from the formerly emphasized region to the currently emphasized region. This approach is useful where one or more regions are emphasized within their contexts, as shown in FIGS. 8, 9, 10*a* and 10*b*.

Figure 11B:
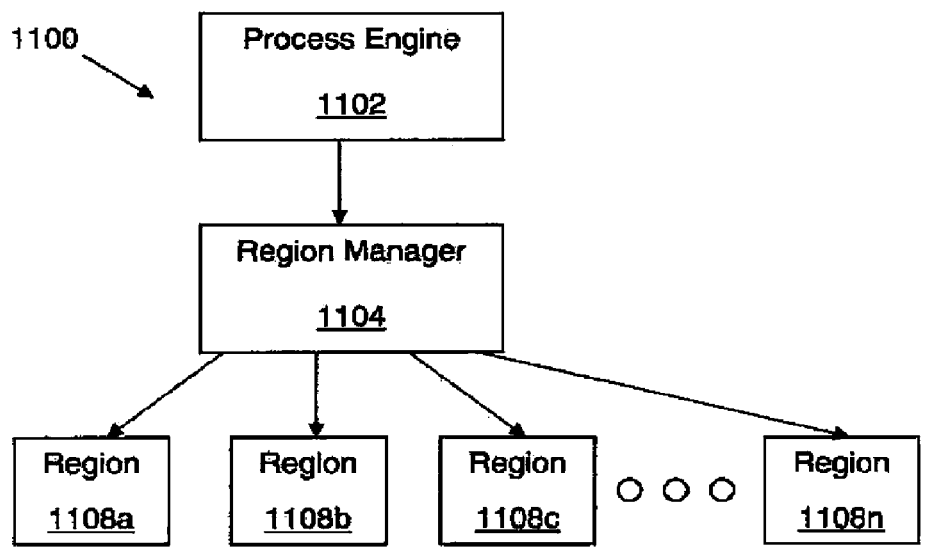
FIG. 11b is a schematic representation of a second exemplary embodiment of an architecture for software implementing aspects of the present invention.

Alternatively, as shown in FIG. 11*b*, the functions of the view manager (not shown in FIG. 11*b*) may be integrated into the region manager 1104, so that the region manager 1104 is responsible not only for identifying the region 1108 that best matches the criteria for switching at any given time, but also for adjusting the visual display to emphasize that region 1108 and/or emphasizing selected regions within the context of at least a portion of the process representation.

Preferably, a computer program implementing aspects of the present invention will provide programmable application programming interfaces (APIs) that enable users to have access to a list of each region's information and query attributes about each region, such as number of activities, total queue size, total resource waiting time, or any other metric relating to the process.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for presenting dynamic data pertaining to a process, the method comprising the steps of:
   receiving region information identifying a plurality of user-selected regions of the process;
   receiving dynamic data pertaining to the process;
   using the dynamic data and region information to generate a dynamic visual representation of at least a portion of the process containing the plurality of one user-selected regions, wherein the dynamic visual representation emphasizes the plurality of one user-selected regions within a context of the portion of the process and includes dynamic data corresponding to each respective one of the plurality of user-selected regions; and,
   receiving switching information identifying criteria for switching among the plurality of user-selected regions, and wherein the dynamic visual representation provides additional emphasis emphasizing, at any given time, only one of the plurality of user-selected regions, wherein a one of the plurality of user-selected regions being additionally emphasized at any given time is automatically determined according to the criteria for switching.

2. The method of claim 1, wherein the plurality of one user-selected regions is emphasized by being larger in size than any non-user-selected region.

3. The method of claim 2, wherein each of the plurality of one user-selected regions each comprises one or more process artifacts, and wherein each of the plurality of one user-selected regions is made larger in size than any non-user-selected region by making at least one of the process artifacts within each of the plurality of one user-selected regions larger than any process artifacts in any non-user-selected region.

4. The method of claim 1, wherein each of the plurality of one user-selected regions is emphasized by use of color.

5. The method of claim 1, wherein each of the plurality of one user-selected regions is emphasized by use of animation.

6. A computer program product comprising at least one computer-usable medium having computer-usable program code for presenting dynamic data pertaining to a process, wherein said computer-usable medium is not a transitory signal per se, said computer program product comprising:
   computer-usable program code for receiving region information identifying plurality of user-selected regions of the process; computer-usable program code for receiving dynamic data pertaining to the process; and
   computer-usable program code for using the dynamic data and region information to generate a dynamic visual representation of at least a portion of the process containing the plurality of user-selected regions, wherein the dynamic visual representation emphasizes the plurality of user-selected regions within a context of the portion of the process and includes dynamic data corresponding to each respective one of the plurality of user-selected regions; and,
   computer-usable program receiving switching information identifying criteria for switching among the plurality of user-selected regions, and wherein the dynamic visual representation provides additional emphasis emphasizing, at any given time, only one of the plurality of user-selected regions, wherein a one of the plurality of user-selected regions being additionally emphasized at any given time is automatically determined according to the criteria for switching.

7. The computer program product of claim 6, wherein each of the plurality of one user-selected regions is emphasized by being larger in size than any non-user-selected region.

8. The computer program product of claim 7, wherein each of the plurality of one user-selected regions comprises one or more process artifacts, and wherein each of the plurality of one user-selected regions is made larger in size than any non-user-selected region by making at least one of the process artifacts within each of the plurality of one user-selected regions larger than any process artifacts in any non-user-selected region.

9. The computer program product of claim 6, wherein each of the plurality of one user-selected regions is emphasized by use of color.

10. The computer program product of claim 6, wherein each of the plurality of one user-selected regions is emphasized by use of animation.

* * * * *